Feb. 12, 1957 J. B. McGAY ET AL 2,780,911
TIMED INTERMITTENT PNEUMATIC DRIVE MECHANISM
Filed March 30, 1953 2 Sheets-Sheet 1

INVENTOR
JOHN B. McGAY
GILBERT B. CLIFT
BY Strauch, Nolan + Diggins
ATTORNEYS

Feb. 12, 1957 J. B. McGAY ET AL 2,780,911
TIMED INTERMITTENT PNEUMATIC DRIVE MECHANISM
Filed March 30, 1953 2 Sheets-Sheet 2

INVENTOR
JOHN B. McGAY
GILBERT B. CLIFT
BY Strauch, Nolan & Diggins
ATTORNEYS

United States Patent Office 2,780,911
Patented Feb. 12, 1957

2,780,911
TIMED INTERMITTENT PNEUMATIC DRIVE MECHANISM

John B. McGay and Gilbert B. Clift, Tulsa, Okla., assignors to Rockwell Register Corporation, Bellefontaine, Ohio, a corporation of New York Application March 30, 1953, Serial No. 351,202

15 Claims. (Cl. 60—7)

The present invention relates to improvements in drives for escapement controlled power output shafts, and more particularly relates to intermittent, escapement controlled pneumatic drives for drive shafts of recording mechanisms such as those used in orifice meters and the like. An example of a recording mechanism to which the drive mechanism of the present invention is applicable will be found in United States Letters Patent No. 1,749,094 issued March 4, 1930 to J. R. Armstrong for Integrating and Recording Device for Fluid Meters. An example of prior art pneumatic drives for escapement controlled drive shafts will be found in United States Letters Patent No. 2,004,909 issued June 11, 1935 to A. F. Benson for Clock. The present invention constitutes an improvement over that disclosed in the copending application of John B. McGay and Gilbert B. Clift, Serial No. 305,606 for Pneumatically Wound Drive Mechanisms filed August 21, 1952, now Patent No. 2,716,860, issued Sept. 6, 1955.

Certain disadvantages have been encountered in comparable prior art devices, among which are the relatively high cost of manufacture and delicacy of the mechanism, both of which result from the comparatively complex nature thereof, and the limitation as to the amount of usable power available at the output shaft for a given drive turbine and pressure source. The present invention contemplates a simplified pneumatic power drive mechanism having a greatly reduced number of parts and affording increased power output by driving the output shaft directly from the pneumatic turbine.

It is, accordingly, a primary object of the present invention to provide an improved, simple, compact, pneumatically-powered drive mechanism for applying drive torque to a drive shaft for a recording device such as those used in orifice meters and the like.

It is a further object of the invention to provide a novel direct pneumatic drive for power output shafts.

It is a still further object of the invention to provide a novel, intermittently-applied, escapement-timed drive for drive shafts of clocks, recording devices and the like.

Another object of the present invention is to provide a novel drive mechanism for an escapement controlled power output shaft which is effective automatically to extract energy intermittently from a fluid stream and use such energy for energizing an escapement which escapement in turn controls the interval between the extractions of energy.

Still more specifically, it is an object of the present invention to provide a drive mechanism for an escapement controlled drive shaft in which a fluid stream powered turbine rotor is directly connected to said drive shaft and intermittently operated to rotate said drive shaft, the intervals between intermittent operation of said turbine rotor being timed and regulated by an escapement energized by means of power supplied from said rotor during periods of operation.

A further object of the present invention is the provision of an improved pneumatically powered drive mechanism for an escapement controlled drive shaft in which the primary source of power is a fluid operated turbine directly connected to the output shaft, in which a movable shield intermittently interrupts the flow of operating fluid to said rotor, in which an escapement controls the rate of movement of said shield, and in which energy storing means, intermittently replenished from said primary power source, drives said escapement.

It is a further object of the present invention to provide a novel, pneumatically powered drive mechanism for applying drive torque to a drive shaft which comprises compact subassemblies which may be readily assembled and disassembled for inspection, cleaning, and general maintenance.

These and further objects and advantages of the present invention will become more fully apparent by reference to the appended claims and as the following detailed description thereof proceeds with continued reference to the accompanying drawings wherein:

Figure 3 is a sectional view taken on line 3—3 of Figure 2 with portions broken away to show underlying structural details; and Figure 4 is a fragmental view partly in section on line 4—4 of Figure 3.

Figure 2:
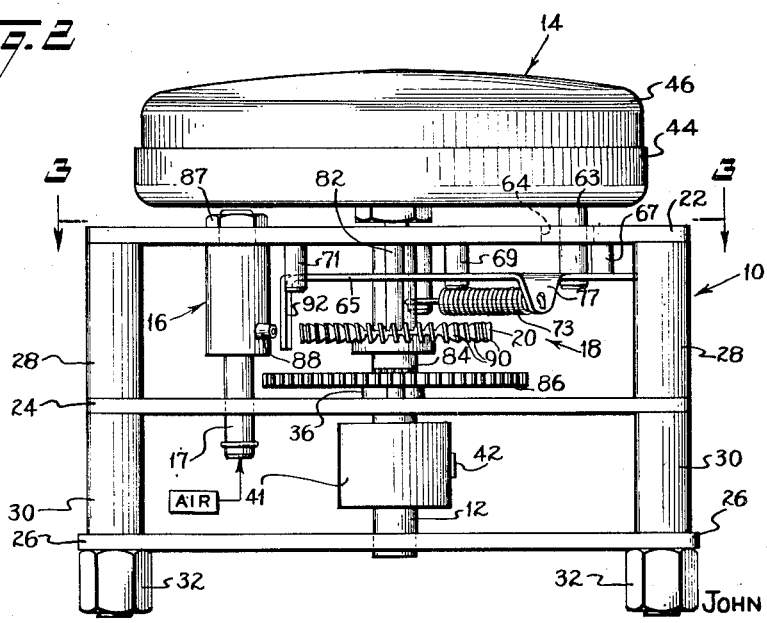
Figure 2 is an elevational view of the mechanism shown in Figure 1.

Referring now to the drawings in detail and particularly in reference to Figure 2, the illustrated drive assembly, which is constructed in accordance with the principles of the present invention, is shown to comprise, in general, a support structure 10 upon which is journalled a drive shaft 12 coupled to an escapement mechanism 14, and a pneumatically powered drive mechanism for applying drive torque to the shaft 12 and the escapement mechanism 14 which drive mechanism includes a nozzle assembly 16 adapted to be coupled as by means of an inlet stem 17, to a source of fluid, such as air, under pressure and to direct a stream of such fluid therefrom, and a drive mechanism assembly 18 including a turbine rotor 20 which is normally disposed within the path of the fluid stream discharged from the nozzle assembly 16 and which is kinematically related to the shaft 12 through a drive train which will hereinafter be described in detail.

The support structure 10 is formed by three spaced parallel plates 22, 24 and 26 which are held in spaced parallel relation by spacers 28 interposed between plates 22 and 24, and screws 32 each of which extends through plate 26, a sleeve 30, and plate 24 and is threadedly received in the adjacent end of the aligned spacer 28 to form a rigid assembly.

As best appears in Figure 4, shaft 12 extends vertically through the entire support assembly and is rotatively mounted between the plates 22 and 24, being journalled in suitable bearing apertures 34 and 35, respectively, and supported by means of a radial flange 36 which bears and supports the shaft on plate 24.

As shown in Figure 4, shaft 12 is formed with an axial bore 38, closed at its lower end and intersected in the vicinity of its lower end by an aperture 39 in the side wall of the shaft. An escapement arbor 40, drivingly related to the escapement mechanism at its upper end in a manner hereinafter described, is received in bore 38 of the shaft and locked against rotation or axial displacement relative to the shaft by means of a collet 41 carrying a radial set screw 42 adapted to enter aperture 39 and engage the arbor. Thus, the relative angular relation of the shaft and arbor may be adjusted and locked in any desired position.

Figure 1:
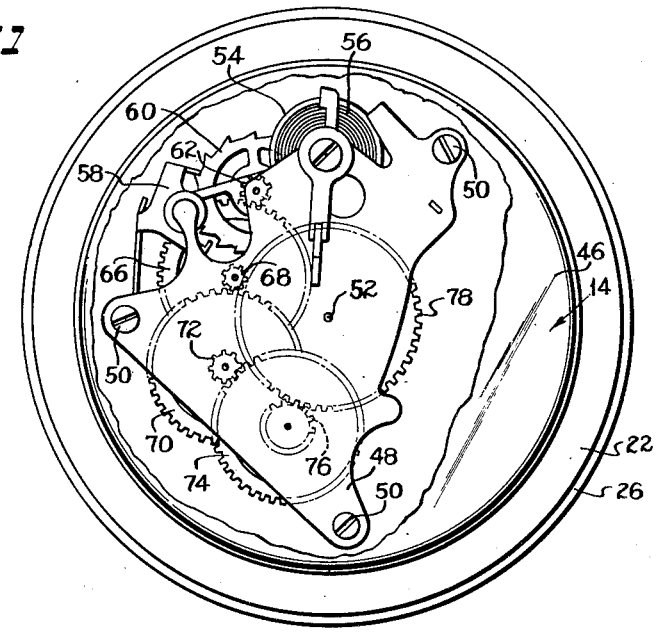
Figure 1 is a top plan view of a pneumatically powered drive mechanism for an escapement controlled drive shaft embodying the principles of the present invention.

Referring now to Figures 1 and 2, the escapement mechanism 14 is mounted within a housing formed by a cup-shaped member 44 provided with a transparent cover 46 and is assembled upon a pair of identical, spaced, aligned, parallel plates (one shown at 48, Figure 1) which are fixed to the housing member 44 in such relation by spaced screws 50. The active parts of the escapement mechanism 14 are connected to arbor 40 by a shaft 52 (Figure 1), journalled between plates 48 and, which, at its lower end, is formed with a recess of non-circular cross section for reception in driving engagement of a similarly non-circular section on the upper end of arbor 40.

The escapement mechanism 14 may be of any suitable standard type and in its disclosed form includes a balance wheel 54 which is conventionally coupled to a hair spring 56 and connected by an oscillating pilot lever 58 to an escapement wheel 60. The escapement wheel 60 is operatively connected to the shaft 52 by a meshed gear train consisting of a pinion 62 fixed to wheel 60, a gear 66 meshing with pinion 62, a pinion 68 fixed to gear 66, a gear 70 meshing with pinion 68, a pinion 72 fixed to gear 70, a gear 74 meshed with pinion 72, a pinion 76 fixed to gear 74, and gear 78 meshing with pinion 76 and fixed to shaft 52. Gear 66 and pinion 68, gear 70 and pinion 72, and gear 74 and pinion 76 respectively form gear clusters which are mounted for rotation about independent spaced parallel axes extending perpendicularly between the plates 48. A substantially constant biasing torque is applied to the escapement wheel 60 through the connecting arbor 40, shaft 52 and the gear train just described to provide the necessary biasing torque to effect operation of the escapement mechanism. The mechanism producing such biasing torque will now be described in detail.

Referring now to Figures 2 and 3, a pin or stud 63 is suitably fixed to and depends from the underside of cup-shaped member 44 of the escapement housing, and extends through slot 64 in the upper plate 22 thus permitting limited angular displacement of the escapement housing. On the underside of plate 22, a control lever 65 is pivotally secured, at one end as at 67. Pivotal movement of control lever 65 is limited between a pair of depending stop lugs or pins 69 and 71 and is normally biased against the former by means of a spring 73 tensioned between a spring stud 75 and a depending attachment tab 77 formed on the lever 65. Adjacent its pivoted end, one lateral edge of lever 65 is provided with a cam surface 80 operatively engaging stud 63 on the escapement housing.

The turbine rotor 20 is mounted for rotation about a vertical axis defined by a shaft 82 (Figure 2) integral with or drivingly related to the rotor and having its upper and lower ends rotatively journalled in suitable bearing apertures in plates 22 and 24, respectively. Also fixed to or integral with shaft 82 and/or rotor 20, and in subjacent relation to the latter, is a pinion 84 meshed with a gear 86 drivingly mounted on shaft 12.

Nozzle assembly 16, preferably of the type fully disclosed in copending application Serial No. 305,606 mentioned hereinabove, depends from and is secured to plate 22 as by nut 87 and includes a nozzle 88 which is so constructed and arranged as to direct a fluid stream for impingement on a plurality of blades or buckets 90 peripherally disposed on the turbine rotor 20, thereby to impart rotational movement thereto in a counterclockwise direction as viewed in Figure 3. The free end of control lever 65 terminates, adjacent the nozzle assembly, in depending tab 92 which is adapted to serve as a valve or shield to block the turbine blades from the jet issuing from nozzle 88, according to the angular disposition of the lever on its pivot 67. Thus it will be seen that, with the lever held against the stop lug 69 by the tension of spring 73, the fluid issuing from nozzle 88 will impinge on blades 90 to drive the rotor whereas, with the lever against the stop lug 71, the shield tab is disposed directly between the nozzle 88 and those rotor blades at which it is directed thereby rendering the pneumatic drive inoperative.

The lower end of the shaft 12 may be suitably coupled directly to a final power output shaft (not shown) or a unidirectional clutch may be interposed between the shaft 12 and the final power output shaft as explained in the aforementioned application Serial No. 305,606.

From the foregoing description it will be understood that the operation of the novel drive mechanism is as follows:

When nozzle assembly 16 is connected to a source of fluid under suitable pressure to start operation, such fluid issues from nozzle 88 and, control lever 65 being in the position shown in solid lines in Figure 3, impinges on the blades 90 driving the rotor 20 in a counterclockwise direction and exerting, through the medium of pinion 84, a clockwise torque on gear 86 and shaft 12. However, since gear 86 and shaft 12 are connected to the escapement mechanism 14 through arbor 40 and therefore can rotate relative to the escapement housing 44 only at a slow rate predetermined and governed by the escapement, the entire escapement housing 44, 46 is rotated in a clockwise direction until stud 63, acting on cam surface 80 of lever 65, pivots the lever away from lug 69 and against lug 71, increasing the tension in spring 73 in the process. When lever 65 has reached the position in which it abuts lug 71, (broken lines, Figure 3) flow of pressure fluid is cut off by shield tab 92, and the turbine stops, as does gear 86 driven thereby. Up to this stage of operation, then, shaft 12, along with arbor 40 and the escapement housing, has been rotated by an increment proportional to the spacing between lugs 69 and 71 and a portion of the energy supplied by the turbine stored in the spring 73.

A complete cycle of operation of the clockwork mechanism is accompanied by an intermittent actuation of the turbine rotor. As just described, the drive connection from the turbine rotor 20 through the escapement gear train in the casing 14 attempts to restrain rotation of the turbine rotor to a speed determined by the escapement setting and a reaction torque is realized in the escapement frame. Because the escapement frame is fastened to the casing 14 and the casing is mounted for limited rotation, the reaction torque causes the escapement casing and contained gear train to rotate about the axis of main shaft 12, thereby enabling an equal limited rotation of shaft 12 in addition to any rotation of shaft 12 permitted by the escapement. This permits relative high speed turbine rotation during the movement of the casing in a direction against the bias of spring 73. That direction of movement of the casing, through stud 63, will move the control lever 65 to block or deflect fluid flow from nozzle 88 against the turbine rotor. When the control lever 65 is moved by the casing to this blocking or deflecting position there is no force present to continue rotation of the turbine other than its small amount of inertia. At this point the turbine rotation will rapidly slow down to a stop and the control lever and casing start a reverse rotation under spring force. The casing can reversely rotate because of two paths of movement (1) if the driving shaft 12 is permitted to rotate backward or (2) if rotation of the casing relative to the shaft 12 is permitted by escapement movement. When the drive shaft 12 is connected to a driven element, for example a chart driving mechanism, a relatively large amount of inertia and friction will prevent the shaft 12 from reversely rotating under the relatively small spring force, and as the turbine rotor is directly gear connected to the shaft 12, it will not be reversely rotated, but will remain stationary until the control lever again permits fluid flow to impinge on the turbine.

When the casing returns under spring bias to a position determined by whatever position the control lever 65 must move to for the fluid stream from the nozzle 88 to overcome the stationary inertia of the rotor 20 to again start its rotation, the cycle will be repeated. After the apparatus starts operation, the control lever will not normally hit the abutment pins during its cycling. The theoretical equilibrium point where no cycling of the control lever would occur is actually never attained because of the high turbine rotational speed which will always tend to carry the control lever beyond its theoretical equilibrium position and, during the reverse movement of the control lever, the inertia of the gearing and the turbine rotor creates sufficient lag so the control lever moves back through what would be a theoretical equilibrium position. However, the fact that an equilibrium position is not attained does not affect desired results.

It is to be noted that the result of such an operation, cyclically repeated, is an intermittent, unidirectional rotation of the shaft 12 in equal increments under the full and direct drive of the turbine; and that the intervals between periods of rotation are accurately controlled by means of an escapement operative under the force of spring 73, which force is, for all practical purposes, constant; and that spring 73, which serves as the power storing means for driving the escapement, is intermittently and automatically energized from the primary drive means, turbine rotor 20.

Because of the starting friction of the turbine rotor 20 and its inherent inertia in actual operation, control lever 65 cycles back and forth between its limit fluid stream on-off positions as described above instead of seeking and finding a theoretically possible intermediate equilibrium position in which the fluid jet from nozzle 88 would only partially cut off and the rotor might continuously rotate at only partial speed.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In combination with an escapement mechanism and a power output shaft: means for imparting intermittent unidirectional impulses of drive torque to said output shaft, comprising a turbine rotor coupled to said output shaft; means for directing a stream of fluid under pressure to impinge on and drive said rotor; means intermittently operative to shield said turbine rotor from the fluid stream formed by said directing means; and means including said escapement mechanism for timing the intervals between the intermittent operation of said shielding means.

2. In combination, a rotatable shaft; a turbine rotor drivingly connected to said shaft; fluid jet means for driving said rotor; movable means operative in one position to render said jet means ineffective to drive said rotor; means, actuated by said rotor when driven, for moving said movable means to said one position; means resiliently biasing said movable means away from said one position; and an escapement operatively connected to said movable means to control the rate of movement thereof away from said one position.

3. In combination, a rotatable power output shaft; a turbine rotor directly drivingly coupled to said shaft; fluid jet means for driving said rotor; means drive coupled to said power output shaft normally operative to render said rotor driving jet means ineffective; and means also drive coupled to said power output shaft for intermittently rendering said normally operative means inoperative at regular timed intervals.

4. In combination with a power output shaft and an escapement mechanism, means controlled by said escapement mechanism and directly drivingly coupled to said output shaft for imparting intermittent unidirectional impulses of drive torque to said output shaft.

5. In combination with means for converting fluid power from a source into drive torque and a torque output shaft directly coupled to said converting means: means for controlling the transmission of fluid power from said source to said converting means and an escapement mechanism responsive to the rotation of said output shaft for directly controlling the operation of said control means.

6. In combination, a rotatable shaft and means for rotating said shaft in one direction by constant preselected increments at constant preselected intervals of time comprising: drive means continuously directly connected to said shaft for driving the latter in said one direction; control means cyclically actuated in response to rotation of said shaft by said preselected increments in said one direction to render said drive means inoperative and thus halt further rotation of said shaft; means cyclically energized by said incremental rotation of said shaft and operative when so energized to de-actuate said control means by degrees and thus permit resumption of operation after an elapsed period of time; and means for regulating the rate of operation of said energized means whereby said elapsed period of time is regulated to said preselected intervals.

7. The combination defined in claim 6 wherein said control means is a pivotal lever and said cyclically energized means is a resilient member operatively secured to said lever to urge same to a position permitting operation of said drive means.

8. The combination defined in claim 7 wherein said regulating means is an escapement operatively associated with said lever and controlling the pivotal movement thereof under the influence of said resilient member.

9. In combination, a support structure; a shaft rotatably journalled on said support structure; an escapement housing; an escapement mechanism mounted therein and operatively connected to said shaft, said housing being free to rotate relative to said support structure and being connected to said shaft through said escapement mechanism whereby the rate of relative rotation of said shaft and housing is regulated by said escapement mechanism; drive means directly connected to said shaft for rotating same in one direction at a faster rate than permitted by said escapement mechanism whereby said escapement housing is concomitantly rotated in said one direction; movable control means adapted, in one position, to render said drive means inoperative; resilient means urging said control means away from said one position; means drivingly associating said escapement housing and control means said means being so constructed and arranged that rotation of the escapement housing in said one direction moves the control means to said one position whereafter said resilient means moves said control means away from said one position and rotates the escapement housing in the opposite direction whereby the periods of time required for said lever to move away from said one position is accurately and invariably regulated; and stop means on said support structure limiting the pivotal movement of said control lever in one direction to said one position and in the opposite direction to a position spaced from said one position.

10. In combination, a support structure; a shaft rotatably journalled on said support structure; an escapement housing; an escapement mechanism mounted therein and operatively connected to said shaft, said housing being free to rotate relative to said support structure and being connected to said shaft through said escapement mechanism whereby the rate of relative rotation of said shaft and housing is regulated by said escapement mechanism; a turbine rotor rotatably mounted on said support and directly drivingly connected to said shaft; a nozzle assembly for directing a stream of fluid under pressure against said rotor for rotating said shaft in one direction at a faster rate than permitted by said escapement mechanism, whereby said escapement housing and shaft are concomitantly rotated in said one direction; a control lever pivotally secured to said support structure and having a portion thereof adapted, in one position of said lever, to obstruct said fluid stream and thus render said turbine inoperative and halt rotation of said shaft; contact means on said escapement housing engaging a portion of said control lever and adapted to move said lever towards said one position during said concomitant rotation of said shaft and housing; means resiliently urging opposite pivotal movement of said lever away from said one position, said opposite pivotal movement being transmitted to said housing through said contact means to urge rotation of said housing relative to said shaft and oppositely to said direction of rotation of said shaft, the rate of said oppositely directioned rotation being governed by said escapement mechanism whereby the rate of movement of said lever away from said one position is accurately and invariably regulated; and stop means on said support structure limiting the pivotal movement of said control lever in one direction to said one position and in the opposite direction to a position spaced from said one position.

11. In combination, a support structure; a shaft rotatably journalled on said support structure; an escapement housing; an escapement mechanism mounted therein and operatively connected to said shaft, said shaft being free to rotate relative to said support structure and being connected to said escapement housing through said escapement mechanism; drive means associated with said support structure and directly drivingly connected to said shaft for rotating the latter in one direction; control means movably mounted on said support and adapted, in one position, to render said drive means inoperative and thus halt rotation of said shaft; spaced stop means on said support structure limiting the movement of said control means in one direction to said one position and to a second position spaced from said one position; means operatively associating said escapement housing and control means for concomitant movement whereby rotary movement of said escapement housing, in one direction, moves said control means toward said one position; and means resiliently urging movement of said lever toward said second position, said opposite pivotal movement being transmitted to said escapement housing through said associating means to urge opposite rotary movement of said housing relative to said shaft, the rate of said oppositely directioned rotation being governed by said escapement mechanism whereby the period of time required for said control means to move away from said one position to said second position is accurately and invariably controlled.

12. In combination, a support structure; a shaft rotatably journalled on said support structure; an escapement housing; an escapement mechanism mounted therein and operatively connected to said shaft, said shaft being free to rotate relative to said structure and being connected to said escapement housing through said escapement mechanism; a turbine rotor rotatably mounted on said support and directly drivingly connected to said shaft; a nozzle assembly for directing a stream of fluid under pressure against said rotor for rotating same and driving said shaft in one direction; a control lever secured to said support for pivotal movement about an axis parallel to said shaft and having a portion thereof adapted, in one position of said lever, to obstruct said fluid stream and render said turbine inoperative and thus halt rotation of said shaft; spaced stop means on said support structure limiting the pivotal movement of said control lever in one direction to said one position and in the opposite direction to a second position spaced from said one position; contact means on said escapement housing engaging a portion of said control lever and adapted to move said lever towards said one position and against the respective one of said stop means when said housing is rotated in the direction of rotation of said shaft; and means resiliently urging opposite pivotal movement of said lever towards said second position, said opposite pivotal movement being transmitted to said housing through said contact means to urge rotation of said escapement housing relative to said shaft and oppositely to said direction of rotation of said shaft; the rate of said oppositely directioned rotation being governed by said escapement mechanism whereby the period of time required for said lever to move away from said one position to said second position is accurately and invariably controlled.

13. In combination, a power output shaft, and means for intermittently driving said shaft comprising power means for directly applying torque to said shaft, an escapement operatively connected to said shaft and means for cyclically interrupting said direct application of torque to said shaft after predetermined equal increments of rotation of said shaft by said power means comprising means energized from said power means and operatively connected to said escapement for regulating the intervals between said increments of shaft rotation.

14. In combination, a power output shaft, and means for intermittently rotating said shaft in equal increments comprising torque generating means continuously directly connected to said shaft for applying torque thereto and means for cyclically interrupting said application of torque after each of said predetermined equal increments of rotation of said shaft by said torque generating means comprising control means operated in response to said incremental rotation of said shaft to render said torque generating means inoperative, an escapement operatively connected to said control means, and means periodically energized in response to rotation of said shaft by said increments for driving said escapement to regulate the intervals between applications of torque to said output shaft.

15. In combination, a power output shaft and means for intermittently rotating said shaft in equal increments comprising torque generating means continuously directly connected to said shaft for applying torque thereto and means for cyclically interrupting said application of torque after predetermined increments of rotation of said shaft by said torque generating means comprising control means movable to one position to render said torque generating means inoperative, means operative in response to rotation of said shaft in said increment to move said control means to said one position, an escapement directly operatively connected to said control means to regulate the rate of movement of said control means away from said one position, and energy-storage means, periodically energized in response to incremental rotation of said shaft biasing said control means toward said one position and powering said escapement.

References Cited in the file of this patent
UNITED STATES PATENTS

| 704,333 | Hurst | July 8, 1902 |
| 2,004,909 | Benson | June 11, 1935 |
| 2,239,334 | Milone | Apr. 22, 1941 |
| 2,257,404 | Urbanski | Sept. 30, 1941 |
| 2,292,090 | Reichel | Aug. 4, 1942 |
| 2,497,508 | Michell | Feb. 14, 1950 |
| 2,716,860 | McGay et al. | Sept. 6, 1955 |